(12) United States Patent
Yoshioka et al.

(10) Patent No.: US 6,520,163 B2
(45) Date of Patent: Feb. 18, 2003

(54) IN-TANK FUEL SUPPLY APPARATUS (75) Inventors: Hiroshi Yoshioka, Tokyo (JP); Seiji Tsutsui, Tokyo (JP); Hideya Wakabayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/942,989

(22) Filed: Aug. 31, 2001

(65) Prior Publication Data
US 2002/0026927 A1 Mar. 7, 2002

(30) Foreign Application Priority Data

Sep. 6, 2000 (JP) ........................ 2000-270265
Mar. 16, 2001 (JP) ........................ 2001-075873

(51) Int. Cl.$^7$ ............................................. F02M 37/04
(52) U.S. Cl. ........................ 123/510; 123/457; 123/511
(58) Field of Search ................................ 123/510, 509, 123/457, 458

(56) References Cited

U.S. PATENT DOCUMENTS

| | | | | |
|---|---|---|---|---|
| 5,392,750 A | * | 2/1995 | Laue et al. | 123/509 |
| 5,649,514 A | * | 7/1997 | Okada et al. | 123/514 |
| 5,769,061 A | * | 6/1998 | Nagata et al. | 123/509 |
| 5,782,223 A | * | 7/1998 | Yamashita et al. | 123/510 |
| 5,785,032 A | * | 7/1998 | Yamashita et al. | 123/509 |

FOREIGN PATENT DOCUMENTS

| | | |
|---|---|---|
| JP | 8-121282 | 5/1996 |
| JP | 8-218984 A | 8/1996 |

* cited by examiner

*Primary Examiner*—Thomas N. Moulis
(74) *Attorney, Agent, or Firm*—Sughrue Mion, PLLC

(57) ABSTRACT

A fuel supply apparatus for installation in a fuel tank includes a fuel pump, a housing, and a filter element disposed in the housing and having an upstream side communicating with the discharge port of the fuel pump. A check valve communicates with a downstream side of the fuel filter, and a pressure regulator communicates with the upstream side of the filter element. A sedimentation flow path may be provided for removing sediment from fuel discharged from the pressure regulator. The sedimentation flow path may be substantially cylindrical vortex spaces between fins disposed on the inner periphery of the pump holder and has blind holes at the bottom for trapping the sediments.

7 Claims, 11 Drawing Sheets

FIG. 14
PRIOR ART

IN-TANK FUEL SUPPLY APPARATUS

REFERENCE TO RELATED APPLICATIONS

This application is based on Japanese Patent Application No. 2000-270265, filed in Japan on Sep. 6, 2000, the contents of which are hereby incorporated by reference.

BACKGROUND OF THE INVENTION

1. Field of the Invention

This invention relates to an in-tank fuel supply apparatus for installation in a fuel tank of a vehicle, for example. In particular, it relates to an in-tank fuel supply apparatus in which a fuel pump, a fuel filter, a pressure regulator, and a check valve are part of an assembly which can be installed in a fuel tank as a single unit.

2. Description of the Related Art

Figure 12:
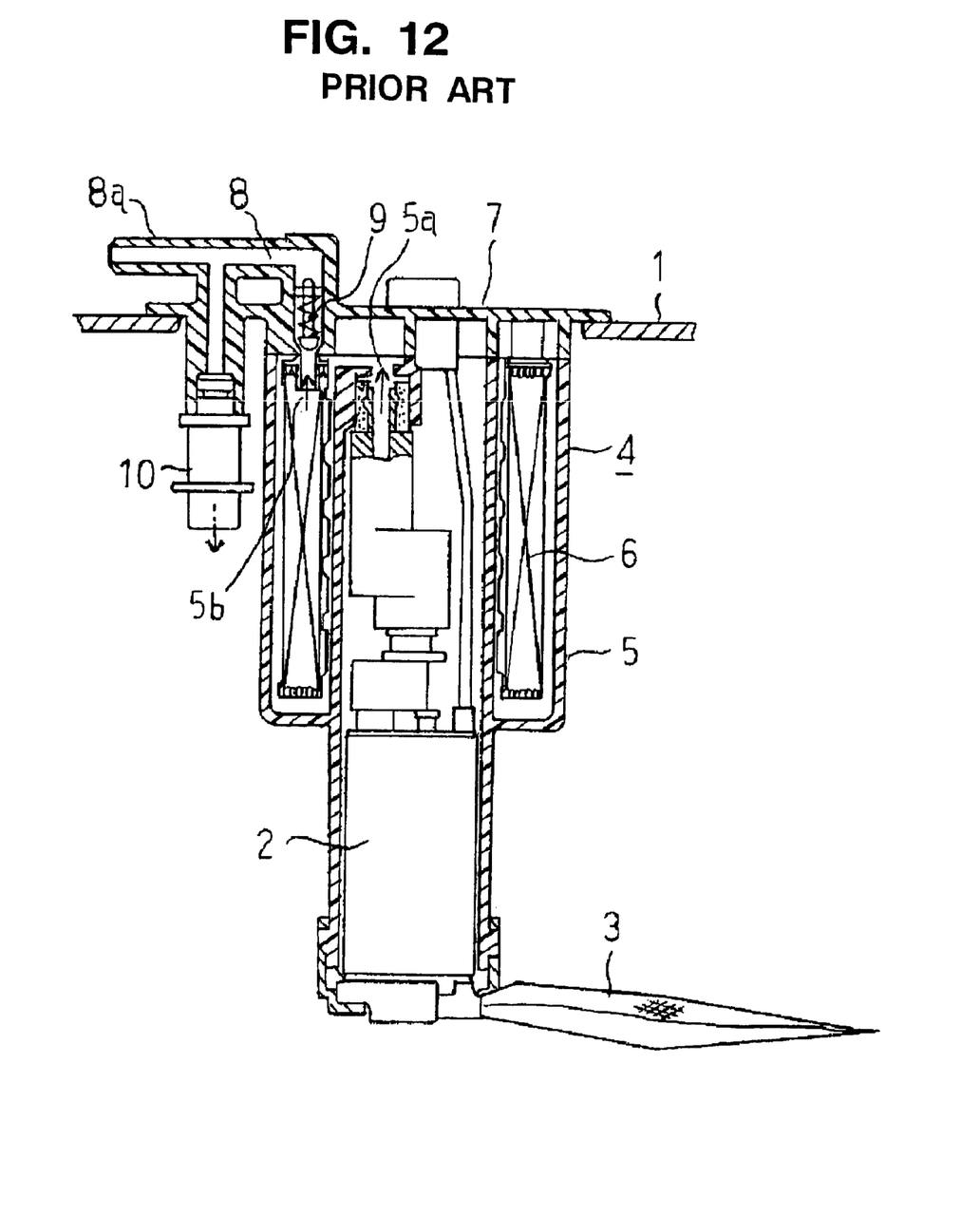
FIG. 12 is a cross-sectional elevation of a conventional fuel supply apparatus.
Figure 13:
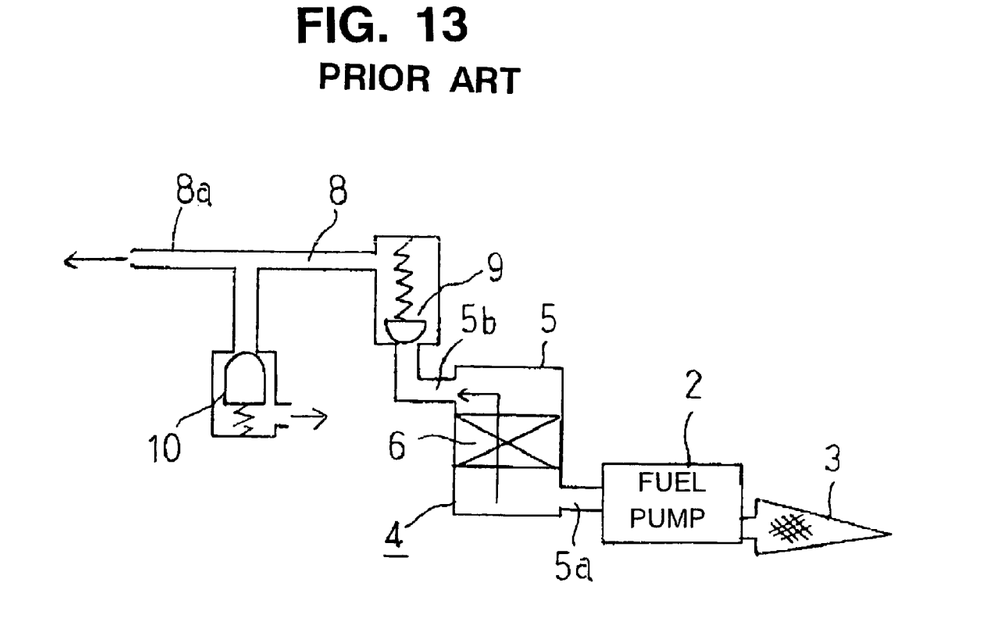
FIG. 13 is a schematic illustration of the fuel supply apparatus of FIG. 12.
Figure 14:
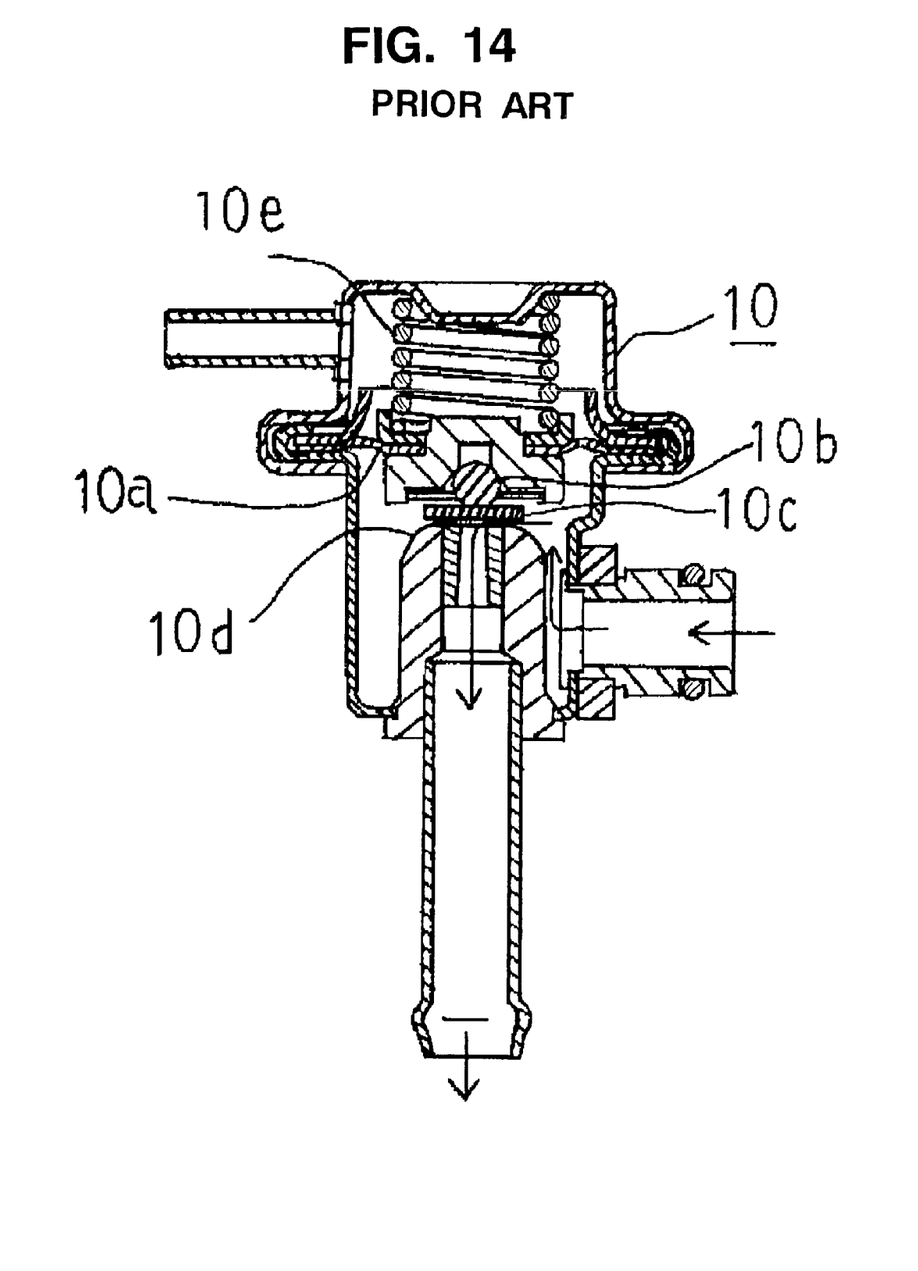
FIG. 14 is an enlarged cross-sectional elevation of a conventional pressure regulator for a fuel supply apparatus.

FIG. 12 is a cross-sectional elevation of a conventional in-tank fuel supply apparatus disclosed in Japanese Published Unexamined Patent Application Hei 11-241659 having a fuel pump, a fuel filter, a pressure regulator, and a check valve combined as part of an assembly for installation in a fuel tank. FIG. 13 is a schematic illustration of the apparatus of FIG. 12, and FIG. 14 is an enlarged cross-sectional elevation of a conventional pressure regulator which can be used as the pressure regulator of the apparatus of FIG. 12.

The fuel supply apparatus of FIGS. 12 and 13 is disposed in a fuel tank 1 and includes a fuel pump 2, an intake filter 3 disposed upstream of the inlet of the fuel pump 2, and a fuel filter unit 4 disposed downstream of the discharge port of the fuel pump 2. A filter element 6 is disposed inside a main housing 5 made from a molded resin. The fuel pump 2 is supported by a downwardly extending lower portion of the main housing 5. The discharge port of the fuel pump 2 communicates through a connecting pipe with a space within the main housing 5 at an inlet 5a on the upstream side of the filter element 6.

The fuel supply apparatus further includes an upper housing 7 made of a molded resin. After the filter element 6 is inserted into the main housing 5, the upper housing 7 is sealed to the main housing 5 in an oil tight manner by solvent bonding or other suitable method to enclose the filter element 6, so that fuel can flow within the fuel filter unit 4 from the inlet 5a through the filter element 6 to the outlet 5b. The upper end of the upper housing 7 has a flange formed thereon by which the fuel supply apparatus can be mounted on the upper surface of the fuel tank 1.

The fuel supply apparatus is equipped with a fuel supply passage 8 for carrying fuel from the outlet 5b of the fuel filter unit 4 to an unillustrated engine. The fuel supply passage 8 is integrally formed with the upper housing 7. A check valve 9 is provided in the fuel supply passage 8 for preventing reverse flow of fuel from the engine to the fuel filter unit 4. The fuel supply passage 8 and the outlet 5b are connected to each other by solvent bonding at the same time that the upper housing 7 is sealed in an oil tight manner by solvent bonding to the upper end of the main housing 5. A pressure regulator 10 is provided for maintaining the pressure of fuel supplied to the engine in a prescribed range. It returns excess fuel which is not supplied to the engine to inside the fuel tank 1. During normal operation of the fuel supply apparatus, the amount of fuel discharged by the fuel pump 2 is greater than the amount of fuel which is consumed by the engine.

FIG. 13 is a schematic illustration of the fuel supply apparatus of FIG. 12. This figure shows that the check valve 9 is disposed downstream of the filter element 6, and that the pressure regulator 10 is mounted on a pipe which branches off the nipple 8a of the fuel supply passage 8 downstream of the check valve 9.

In a fuel supply apparatus of this type, when the fuel pump 2 is operated, liquid fuel is sucked from the interior of the fuel tank 1 by the fuel pump 2 through the intake filter 3. The fuel is pressurized to 200–700 kPa by the fuel pump 2, and then it enters the fuel filter unit 4 through the inlet 5a. Coarse debris and other contaminants are removed from the fuel by the intake filter 3, while fine contaminants are removed from the fuel by the filter element 6 in the fuel filter unit 4. After passing through the filter element 6, the filtered fuel is discharged from the outlet 5b and passes through the fuel supply passage 8 through the check valve 9 to be supplied to the engine. The pressure of the fuel supplied to the engine is maintained in a prescribed range by the pressure regulator 10, which discharges excess fuel to inside the fuel tank 1 when the pressure in the fuel supply passage 8 exceeds a prescribed level due to an increase in the output of the fuel pump 2 or a decrease in fuel consumption by the engine. The check valve 9 maintains the fuel pressure in the engine when the fuel pump 2 is stopped.

In a fuel supply apparatus like that described above, since the pressure regulator 10 communicates with the fuel supply passage 8 downstream of the check valve 9, when the fuel pump 2 is stopped, in order to maintain the fuel pressure in the engine, the pressure regulator 10 must have a good ability to maintain a seal between its upstream and downstream sides.

An example of a pressure regulator having a good sealing ability is shown in FIG. 14, which is an enlarged cross-sectional elevation of a conventional pressure regulator disclosed in Japanese Published Unexamined Patent Application Hei 5-215048. In this pressure regulator 10, a movable valve 10c which is secured to a spherical bearing 10b is mounted on a diaphragm 10a for sensing fuel pressure. The valve 10c opposes a valve seat 10d which communicates with a discharge port.

When the fuel pressure increases to a level such that the force acting upwardly on the diaphragm 10a due to fuel pressure exceeds the downwards force exerted by a back pressure spring 10e, the diaphragm 10a deforms upwards and valve 10c separates from the valve seat 10d to create a gap. As a result, fuel is discharged through the gap between the valve 10c and the valve seat 10d, and the fuel pressure on the engine side of the pressure regulator 10 is maintained constant.

When the fuel pressure decreases below a certain level, the valve 10c is made to contact the valve seat 10d by the force of the back pressure spring 10e, and the discharge of fuel from the fuel regulator 10 is stopped. Since the movement due to deformation of the diaphragm 10a is not uniform, the valve 10c is supported by the spherical bearing 10b so as to be able to freely pivot so that the valve 10c can intimately contact the valve seat 10d and prevent leaks of fuel to the downstream side of the pressure regulator 10 to maintain the fuel pressure in the fuel supply passage 8.

While the pressure regulator 10 of FIG. 14 has good sealing performance, it has the drawback that it is expensive to manufacture due to the need to perform high precision finishing of the spherical bearing 10b, the valve 10c, and the valve seat 10d. Furthermore, the diameter of the diaphragm 10a must be fairly large in order to give the valve 10c good durability and in order to support the valve 10c in a manner such that it can freely pivot, and this leads to an increase in the outer dimensions of the pressure regulator 10, which is an impediment to obtaining a compact fuel supply apparatus.

SUMMARY OF THE INVENTION

The present invention provides a fuel supply apparatus which can employ an inexpensive pressure regulator having a simple and compact structure.

The present invention also provides a fuel supply apparatus which enables an engine which is supplied fuel by the fuel supply apparatus to be quickly restarted after being off for an extended period.

According to one form of the present invention, a fuel supply apparatus includes a fuel pump, a housing, and a filter element disposed in the housing and having an upstream side communicating with a discharge port of the fuel pump. A fuel supply passage communicates with the interior of the housing on a downstream side of the filter element for supplying fuel to an engine. A check valve for preventing reverse flow of fuel through the fuel supply passage communicates with a downstream side of the filter element, and a pressure regulator communicates with the upstream side of the filter element.

The apparatus may further include a sedimentation flow path communicating with an outlet of the pressure regulator for removing sediment from fuel discharged from the pressure regulator and returning the fuel to inside the fuel tank.

The sedimentation flow path may include a recess for receiving sediment which settles from fuel passing through the sedimentation flow path.

The apparatus may further include a pump holder which is attached to the housing and supports the fuel pump, and a vibration absorber disposed between the pump holder and the fuel pump, wherein the sedimentation flow path comprises a space formed between an outer periphery of the fuel pump, an inner periphery of the pump holder, and the vibration absorber.

The housing may include a passage communicating between an upper portion of the housing and the pressure regulator to prevent the housing from running dry when an engine to which the fuel supply apparatus supplies fuel is turned off for an extended period.

The apparatus may further include a pump holder surrounding the fuel pump for supporting the fuel pump from the housing, the sedimentation flow path comprising a space formed between an outer periphery of the fuel pump and an inner periphery of the pump holder.

A portion of the space defined between the inner periphery of the pump holder and the outer periphery of the fuel pump may be vertically partitioned to define an annular sedimentation flow path extending along the outer periphery of the pump holder, and the sedimentation flow path may include substantially cylindrical vortex spaces defined between a plurality of fins projected from the inner periphery of the pump holder and having blind holes disposed at the bottom of the vortex spaces for trapping the sediments.

DESCRIPTION OF PREFERRED EMBODIMENTS

Figure 1:
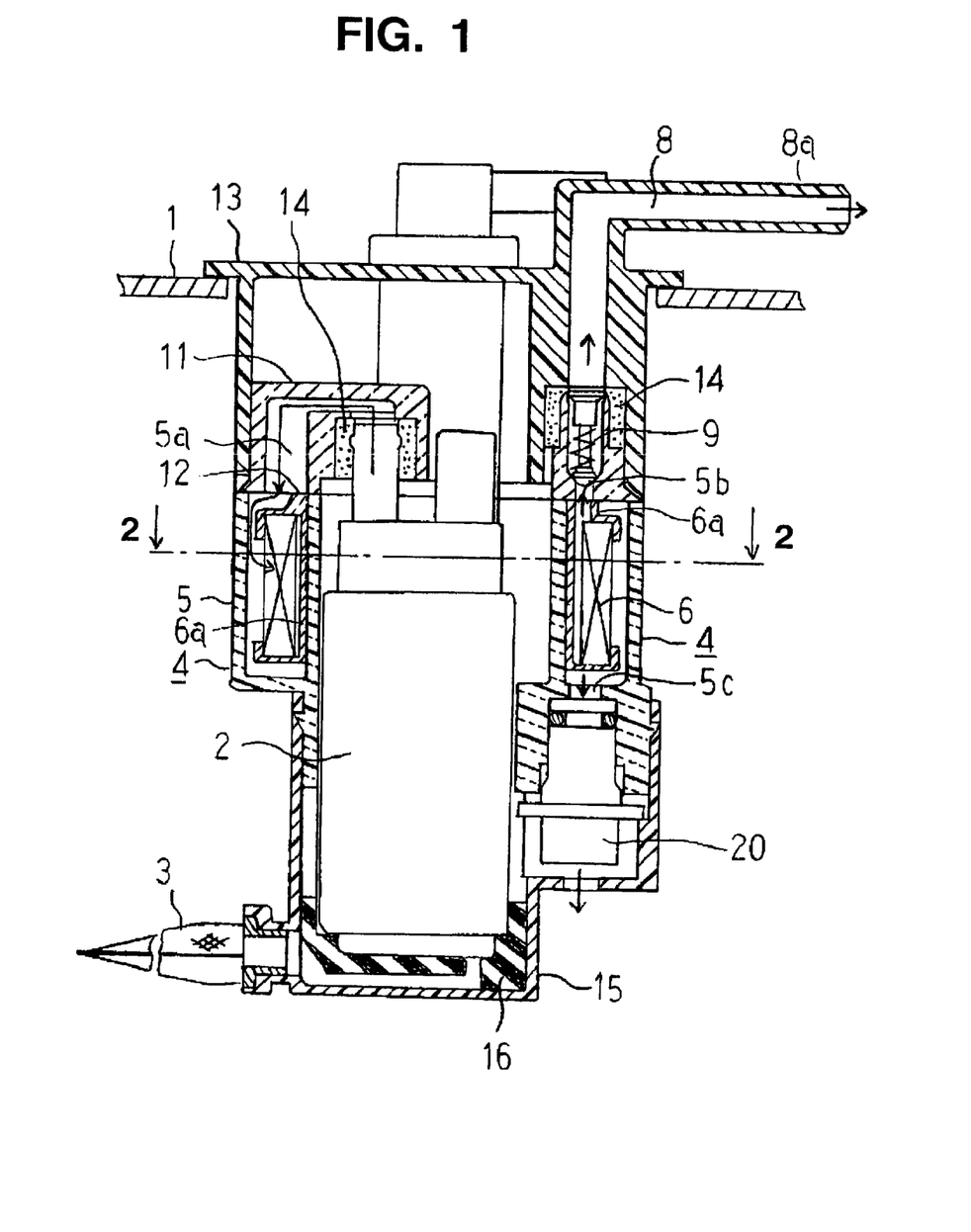
FIG. 1 is a cross-sectional elevation of a first embodiment of a fuel supply apparatus according to the present invention installed in a fuel tank.
Figure 2:
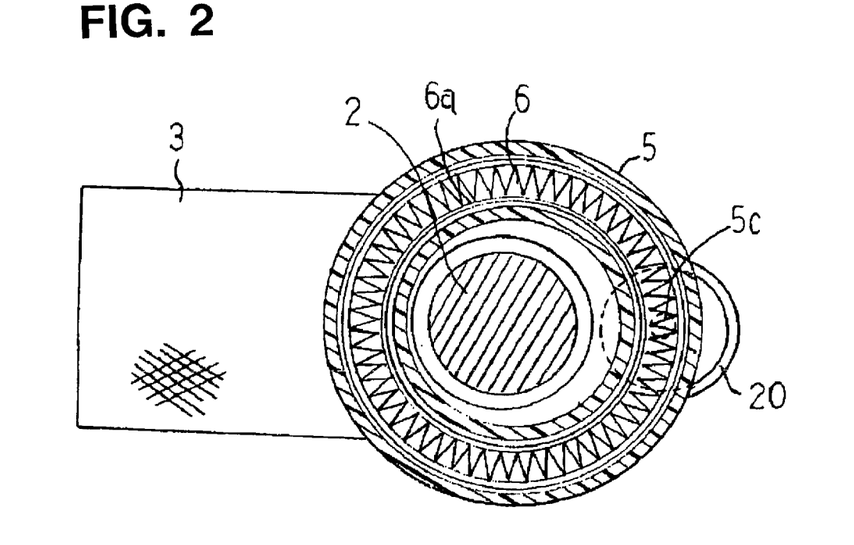
FIG. 2 is a cross-sectional view taken along line 2—2 of FIG. 1.
Figure 3:
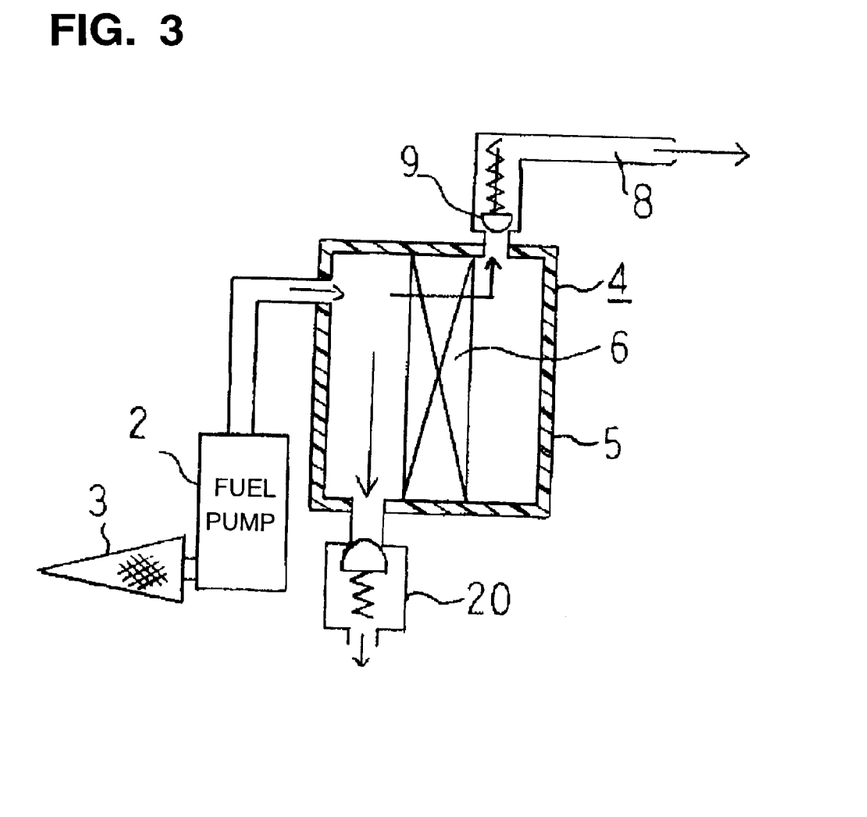
FIG. 3 is a schematic illustration of the embodiment of FIG. 1.
Figure 4:
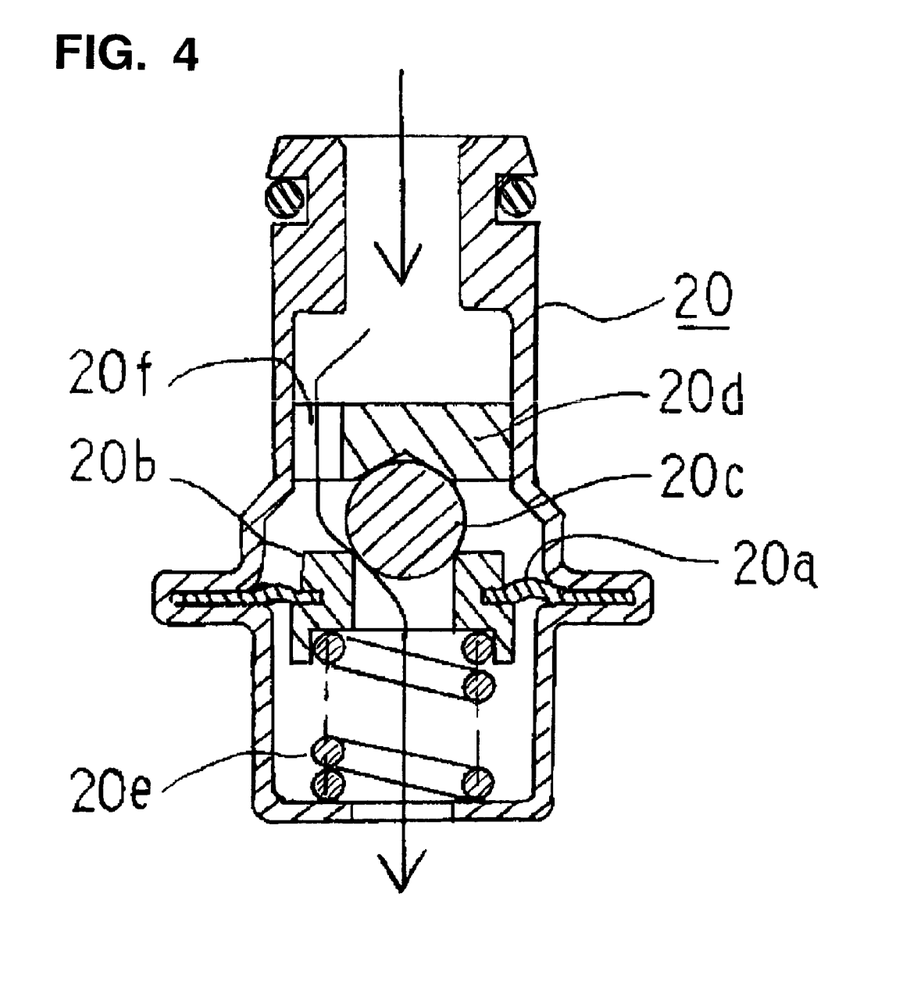
FIG. 4 is an enlarged cross-sectional elevation of the pressure regulator of the embodiment of FIG. 1.

A number of preferred embodiments of a fuel supply apparatus according to the present invention will be described with reference to the accompanying drawings. FIGS. 1–4 illustrate a first embodiment. FIG. 1 is a cross-sectional elevation of this embodiment, FIG. 2 is a cross-sectional view taken along line 2—2 of FIG. 1, FIG. 3 is a schematic illustration of this embodiment, and FIG. 4 is an enlarged cross-sectional elevation of the pressure regulator of this embodiment.

In these figures, elements 1–6, 8, and 9 are the same as explained with respect to FIGS. 12–14, so an explanation of these elements will be omitted.

The illustrated fuel supply apparatus includes a filter element support wall 6a which supports the filter medium of the filter element 6 and separates fuel which has been filtered from unfiltered fuel within the main housing 5. The element support wall 6a is made from an electrically conducting resin, and it acts as a conductor for dissipating static electricity which is generated during filtration of the fuel.

The fuel supply apparatus also includes an upper housing 11 which is made of an electrically conducting resin and is joined to the main housing 5 by solvent bonding or other suitable method along a joining surface 12. A check valve 9 is provided in the upper housing 11 in a location which communicates with the outlet 5b of the main housing 5. When the main housing 5 is joined to the upper housing 11 by solvent bonding, a housing for the fuel filter unit 4 is formed. The element support wall 6a, which is also subjected to solvent bonding, forms a fuel passage communicating with the check valve 9. The element support wall 6a is electrically connected to the upper housing 11, so static electricity can be dissipated through the upper housing 11.

A cover 13 having a mounting flange at its upper end fits over the upper housing 11. The fuel supply apparatus can be mounted in an opening in the top of the fuel tank 1 by means of the flange of the cover 13. The fuel pump 2 is supported by a pump holder 15 which fits over the lower end of the main housing 5. One or more terminals, such as a power supply terminal connected to the fuel pump 2, a grounding terminal connected to the upper housing 11, and a connecting terminal for an unillustrated fuel gauge may be mounted atop the cover 13. A fuel supply passage 8 including a nipple 8a for supplying fuel to an unillustrated engine extends from the top of the cover 13. In addition to supporting the fuel pump 2, the pump holder 15 supports a pressure regulator 20. A vibration absorber 16 made of rubber or other resilient material may be disposed between the pump holder 15 and the lower end of the fuel pump 2 to absorb vibrations of the fuel pump 2. The vibration absorber 16 has an opening in its lower end through which fuel can pass between the intake filter 3 and the inlet of the fuel pump 2. A bush 14 may be provided on the discharge port of the fuel pump 2 and around the check valve 9.

As shown in FIG. 2, the fuel pump 2 is eccentrically disposed with respect to the inner cylindrical wall of the main housing 5, and the pressure regulator 20 is installed at a branch hole 5c at the bottom of the main housing 5. The branch hole 5c is located on the side of the main housing 5 where the gap between the inner wall of the main housing 5 and the fuel pump 2 is largest. The branch hole 5c communicates with a space for unfiltered liquid on the upstream side of the filter element 6 at the bottom of the interior of the main housing 5.

The pressure regulator 20 is not restricted to any particular type. For example, a pressure regulator like the one illustrated in FIG. 14 can be employed. However, as the pressure regulator 20 in the present embodiment communicates with the upstream side of the filter element 6, it can have a simpler, easier to manufacture structure than the pressure regulator 10 of FIG. 11. FIG. 4 illustrates one example of a suitable structure for the pressure regulator 20. It includes a cylindrical valve 20b provided at the center of a diaphragm 20a. The cylindrical valve 20b is urged into contact with a spherical valve seat 20c by a back pressure spring 20e disposed between the valve 20b and the bottom of a tubular housing of the pressure regulator 20. The valve seat 20c is secured by welding or other suitable method to a valve seat holder 20d which is secured to the housing of the pressure regulator 20. A connecting passage 20f for providing fluid communication between the inlet of the pressure regulator 20 (at the upper end of the pressure regulator 20) and the outlet thereof (at the lower end) is formed in the valve seat holder 20d.

When the force acting downwards on the diaphragm 20a due to the inlet fluid pressure is larger than the upwards biasing force exerted by the back pressure spring 20e, the diaphragm 20a is deformed downwards by the fluid pressure, and a gap corresponding to the difference in force is formed between the valve seat 20c and the valve 20b. Fuel passes through the gap and is discharged from the outlet of the pressure regulator 20, and the inlet pressure is maintained constant. When the inlet pressure decreases below a prescribed level, the valve 20b is pushed upwards by the back pressure spring 20e into contact with the valve seat 20c, and the pressure regulator 20 is closed.

FIG. 3 is a schematic illustration of the embodiment of FIG. 1. This figure illustrates that the pressure regulator 20 is disposed on the upstream side of the filter element 6 and the check valve 9 instead of on the downstream side as in the apparatus illustrated in FIG. 13.

The embodiment of FIGS. 1–4 operates in the following manner. When the fuel pump 2 is operated, gasoline or other liquid fuel is sucked from the interior of the fuel tank 1 by the fuel pump 2 through the intake filter 3, which removes coarse contaminants. The fuel is pressurized by the fuel pump 2 and discharged to the interior of the fuel filter unit 4 on the upstream side of the filter element 6. The pressure regulator 20 communicates with the upstream side of the filter element 6, so only fuel which is actually required by the unillustrated engine passes through the filter element 6 for the removal of fine contaminants, and fuel which is not required by the engine is discharged into the fuel tank 1 through the pressure regulator 20. Fuel which passes through the filter element 6 passes through the check valve 9 and into the fuel supply passage 8 for supply to the engine. The pressure within the fuel filter unit 4 is maintained in a prescribed range by the pressure regulator 20, which discharges excess fuel to inside the fuel tank 1 when the pressure in the fuel filter unit 4 exceeds a prescribed level due to an increase in the output of the fuel pump 2 or a decrease in fuel consumption by the engine.

Since only fuel which is actually supplied to the engine passes through the filter element 6, the filter element 6 can have a smaller filtration surface area than the filter element 6 in the apparatus of FIG. 12, so the filter element 6 can be reduced in size, permitting a reduction in the overall size of the fuel supply apparatus.

When the fuel pump 2 is stopped, the check valve 9, which is disposed between the engine and the filter element 6, maintains the fuel pressure on the engine side, so the pressure regulator 20 does not need to be able to form a tight seal against a high pressure. Therefore, the pressure regulator 20 can be a simple device like that shown in FIG. 4 having only a pressure regulating function, so it can be inexpensive and small in size.

When a brushless dc motor which generates no abrased brush contaminant powder is employed as the drive source motor for the fuel pump 2, the fuel supply apparatus of this embodiment can further be minimized.

Figure 5:
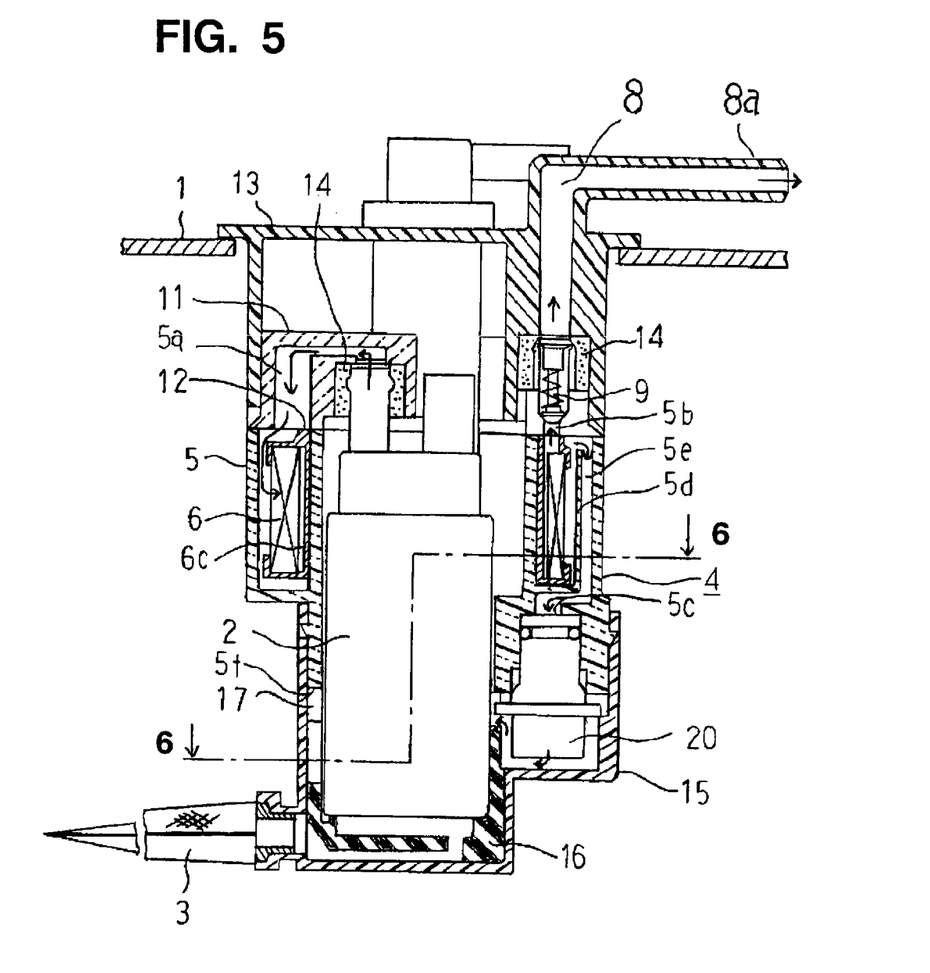
FIG. 5 is a cross-sectional elevation of another embodiment of a fuel supply apparatus according to the present invention installed in a fuel tank.
Figure 6:
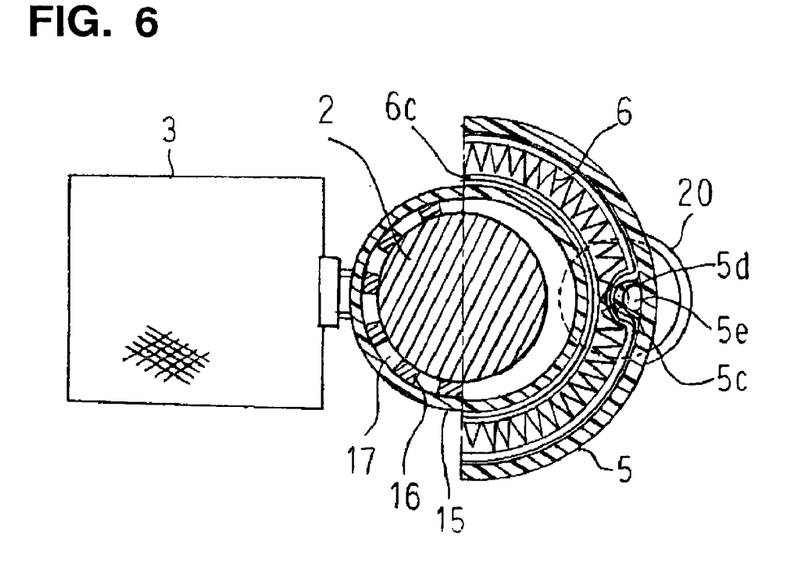
FIG. 6 is a cross-sectional view taken along line 6—6 of FIG. 5.
Figure 7:
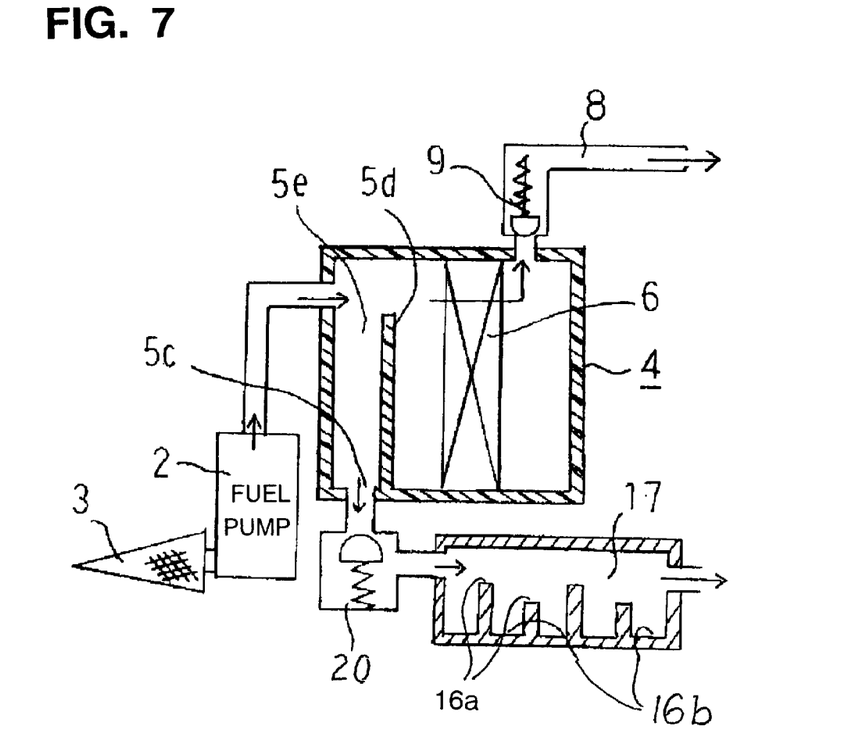
FIG. 7 is a schematic illustration of the embodiment of FIG. 5.
Figure 8:
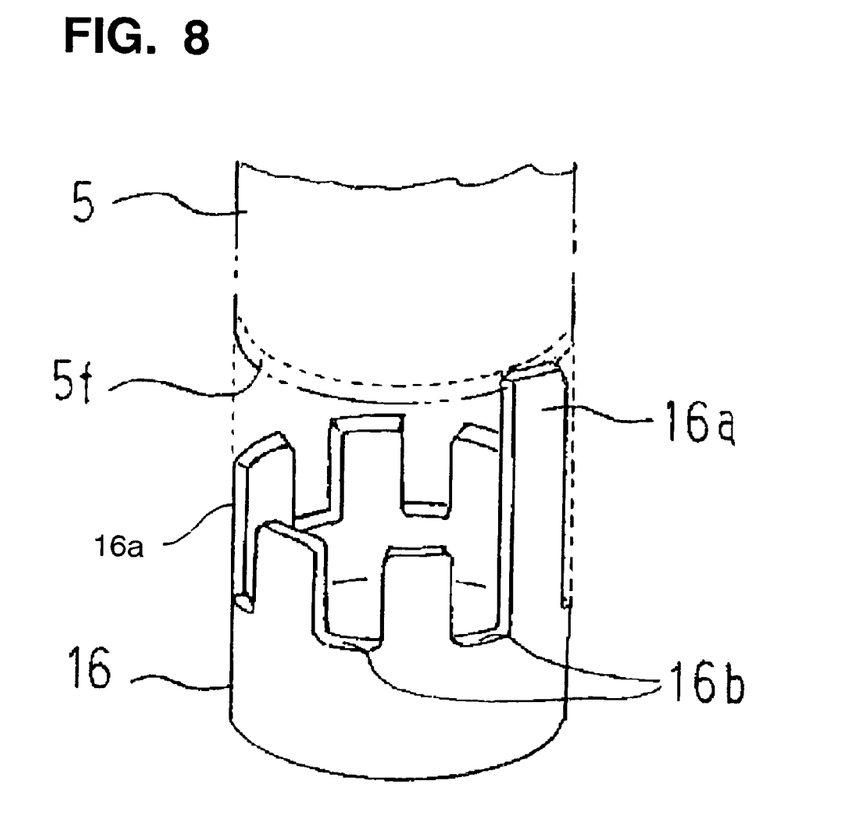
FIG. 8 is an enlarged perspective view of the vibration absorber of the embodiment of FIG. 5.

FIGS. 5–8 illustrate another embodiment of a fuel supply apparatus according to the present invention. FIG. 5 is a cross-sectional elevation of this embodiment, FIG. 6 is a cross-sectional view taken along line 6—6 of FIG. 5, FIG. 7 is a schematic illustration of this embodiment, and FIG. 8 is an enlarged perspective view of the vibration absorber of this embodiment.

The overall structure of this embodiment is similar to that of the preceding embodiment, so only differences between the two embodiments will be described. In this embodiment, instead of fuel which passes through the outlet of the pressure regulator 20 being discharged directly into the fuel tank 1, it is first introduced into a sedimentation flow path 17 in which contaminant particles contained in the fuel can settle out. The sedimentation flow path 17 is formed between the outer periphery of the fuel pump 2 and the inner peripheral wall of the pump holder 15 and between the upper portion of the vibration absorber 16 and the lower end surface 5f of the main housing 5.

FIG. 8 illustrates an example of the shape of the vibration absorber 16 in this embodiment. It is a generally cup-shaped member with a crenelated upper end including a plurality of projections 16a spaced around the circumference of the vibration absorber 16 and a plurality of recesses 16b each disposed between two of the projections 16a and defining a groove for holding sediment which settles out of fuel flowing through the sedimentation flow path 17. One of the projections 16a is elongated and extends to the lower end surface 5f of the main housing 5 and defines a partition which separates the inlet and the outlet of the sedimentation flow path 17 from each other. The remaining projections 16a are shorter and do not extend to the lower end surface 5f of the main housing 5 so that fuel can flow along the space between the upper ends of these shorter projections 16a and the lower end surface 5f. A passage which communicates between the intake filter 3 and the inlet of the fuel pump 2 is formed in the bottom of the vibration absorber 16. The inlet of the sedimentation flow path 17 communicates with the outlet of the pressure regulator 20, and the outlet of the sedimentation flow path 17 is defined by a hole which is formed in a suitable location in a wall of the pump holder 15 which communicates with the interior of the fuel tank 1. The vibration absorber 16, which is made of a resilient material, is elastically compressed between the inner surface of the pump holder 15 and the outer surface of the fuel pump 2, so it forms a seal against the pump holder 15 and the fuel pump 2 along the length of the sedimentation flow path 17 so that fuel can enter and leave the sedimentation flow path 17 only through the inlet and outlet thereof.

Figure 9:
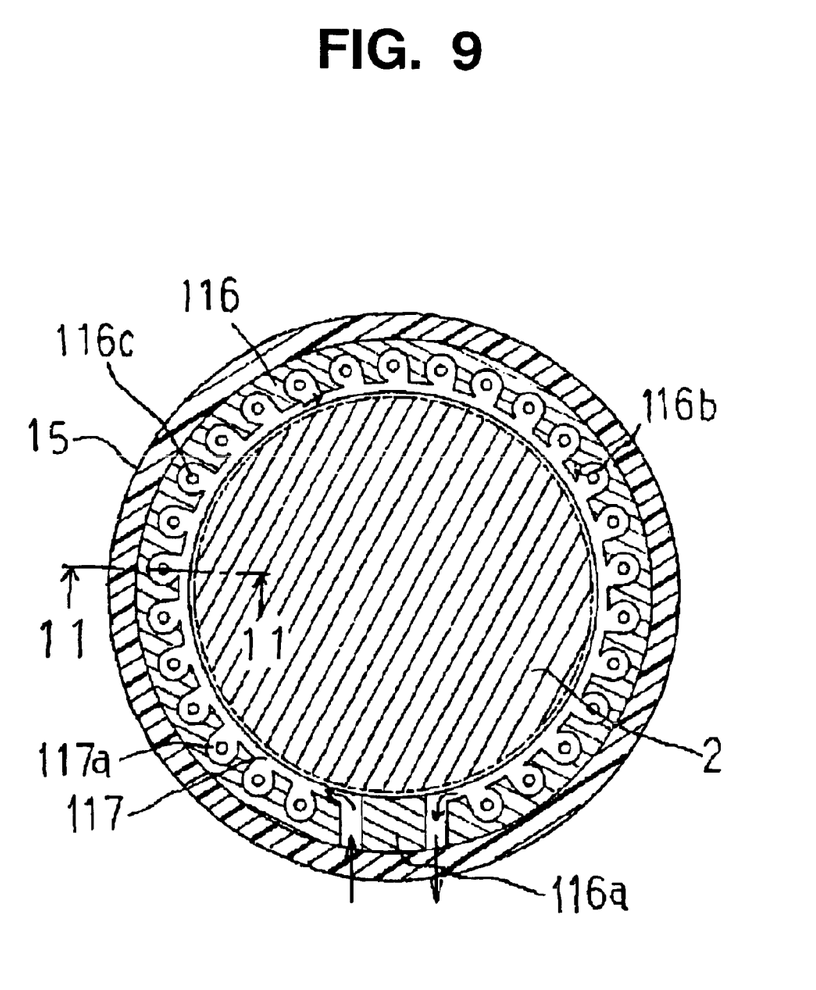
FIG. 9 is a cross-sectional view of another embodiment of the sedimentation flow path defined by the vibration absorber.
Figure 10:
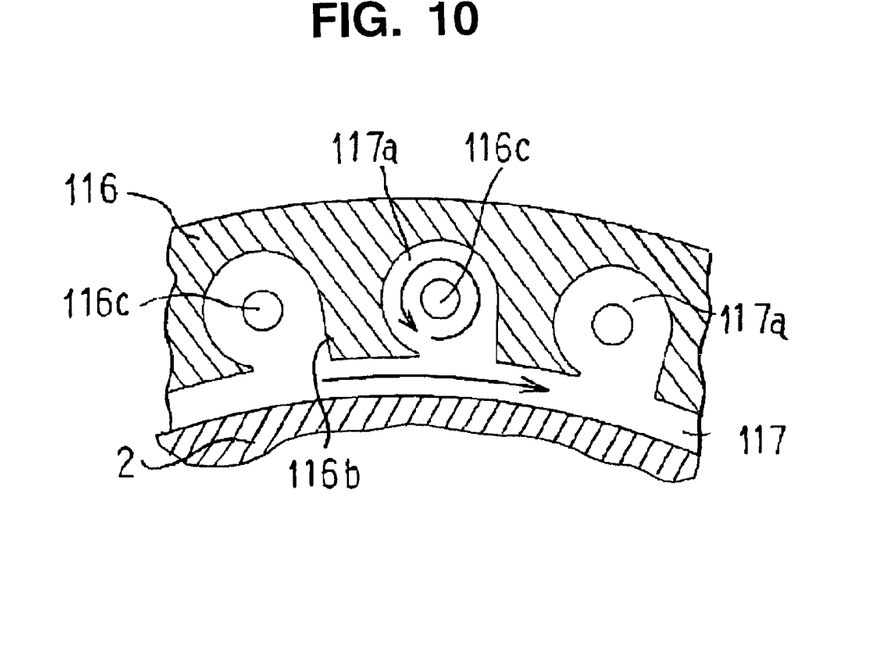
FIG. 10 is an enlarged fragmental sectional view of the sedimentation flow path shown in FIG. 9.
Figure 11:
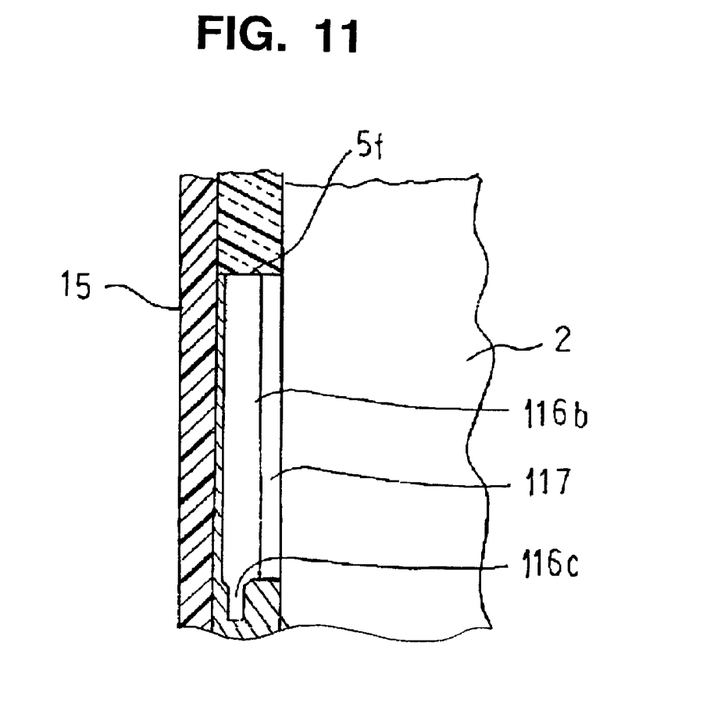
FIG. 11 is a sectional side view taken along line 11—11 of FIG. 9.

FIG. 9 is a cross-sectional view of another vibration absorber 116 for defining a sedimentation flow path 117 that can be used instead of the vibration absorber 16 of FIG. 5, FIG. 10 is an enlarged fragmental sectional view of the sedimentation flow path 117 shown in FIG. 9, and FIG. 11 is a sectional side view taken along line 11–11 of FIG. 9.

The vibration absorber 116 illustrated in FIG. 9–11 comprises a vertically extending partition wall 116a having an upper end that abuts against a bottom surface 105f of the main housing 105 to vertically partition and define an inlet 117b and an outlet 117c of the sedimentation flow path 117. In the annular sedimentation flow path 117, a number of fins 116b are disposed to extend from the inner periphery of the outer wall extending from the vibration absorber 116 into the sedimentation flow path 117 and in the direction perpendicular to that of the fuel flow within the sedimentation flow path 117 and the fins 116b define substantially cylindrical vortex spaces 117a between them. Each of the vortex spaces 117a has at its bottom end a blind hole 116c which is beveled at its open end. These blind holes 116c are independent from each other so that they generate stagnation points in the fuel flow within the sedimentation flow path 117.

The inlet 117b of the sedimentation flow path 117 communicates with the discharge port of the pressure regulator 20. The outlet 117c of the sedimentation flow path 117 is defined by a communication hole formed at a suitable position in the wall of the pump holder 15 to open to the interior of the fuel tank 1. The sedimentation flow path 117 is substantially hermetically closed except for the inlet 117b and outlet 117c by fitting the vibration absorber 116 between the fuel pump 2, the pump holder 15 and the main housing 5 in a slightly elastically compressed state.

In the embodiment of FIG. 1, the fuel which is actually supplied to the engine passes through the filter element 6 and has fine contaminants removed from it. However, excess fuel which is not supplied to the engine is discharged into the fuel tank 1 by the pressure regulator 20 without having passed through filter element 6, since the pressure regulator 20 communicates with the upstream side of the filter element 6.

When the fuel pump 2 employs a direct current motor as a drive source, powder caused by abrasion of the brushes and the commutator of the motor is frequently generated, and this powder is introduced as contamination into the fuel passing through the fuel pump 2. The amount of the contaminant powder present in the fuel which is not supplied to the engine increases with the length of operation of the fuel pump 2. The contaminant powder circulates from the fuel pump 2 to the fuel filter unit 4 to the pressure regulator 20 to the interior of the fuel tank 1 to the intake filter 3 and back to the fuel pump 2. In the embodiment of FIG. 1, the contaminant powder can be the cause of problems such as clogging of the intake filter 3, a decrease in the sealing ability of the pressure regulator 20, and an increase in the rotational resistance of the pump 2.

In the embodiments of FIGS. 5–8 and 9–11, the amount of contaminant powder present in the fuel circulating through the fuel supply apparatus is decreased by the sedimentation flow path 17. Powder formed by the abrasion of the brushes and the commutator of the motor of the fuel pump 2 has a higher specific gravity than the fuel in which it is contained, which is typically gasoline or similar liquid. Therefore, when fuel containing the contaminant powder is discharged from the pressure regulator 20 and introduced into the sedimentation flow path 17 illustrated in FIGS. 5–8, where the flow speed of the fuel is reduced, the contaminant powder settles out of the fuel within the sedimentation flow path 17 and collects as sediment in the recesses 16b of the vibration absorber 16 instead of being discharged into the fuel tank 1.

When fuel containing the contaminant powder is discharged from the pressure regulator 20 and introduced into the sedimentation flow path 117 defined by the vibration absorber 116 illustrated in FIGS. 9–11, where the flow path 117 is circular, the flow together with the contaminant powder is subjected to a centrifugal force and the contaminant powder which has a higher specific gravity than the fuel is introduced into the substantially cylindrical vortex spaces 117a, which is disposed at the outer boundary of the sedimentation flow path 117 and defined in the inner circumferential surface of the vibration absorber 116. Since vortexes are generated within the vortex spaces 117a due to the fuel flow in the flow path 117 is substantially tangential to the cylindrical vortex spaces 117a, the contaminants entrained in the fuel are sucked in the vortex to descend along the wall surface of the vortex spaces 117a due to the gravity to finally trapped by the blind holes 116c disposed at the bottom of the vortex spaces 117a. Thus, the contaminant powder cannot further circulates in the fuel flow path between the fuel tank and the fuel supply apparatus.

While the vortex spaces 117a are defined by the fins 116b that extend from the vibration absorber 116 and the blind holes 16c are formed into the surfaces of the vibration absorber 116 in the embodiment shown in FIGS. 9–11, similar vortex spaces and blind holes may equally be defined in the inner circumferential surface of the pump holder 15.

Another benefit of the sedimentation flow path 17 shown in FIGS. 5–8 or the sedimentation flow path 117 shown in FIGS. 9–11 is that since the fuel discharged from the pressure regulator 20 is not introduced directly into the fuel tank 1 but is introduced into the fuel tank 1 through the sedimentation flow path 17 or 117, the discharge noise of the pressure regulator 20 can be decreased.

The embodiment of FIGS. 5–8 may further include a connecting pipe 5d which extends vertically within the main housing 5 along the outer wall thereof between the upper portion of the main housing 5 and the branch hole 5c. The interior of the connecting pipe 5d defines a connecting passage 5e which communicates between the upper portion of the main housing 5 and the branch hole 5c. As schematically illustrated in FIG. 7, flow to the pressure regulator 20 branches off from other flow within the main housing 5 at the upper portion of the main housing 5. The lower end of the connecting pipe 5d surrounds the branch hole 5c so that fuel within the main housing 5 can enter the branch hole 5c only by passing through the connecting pipe 5d.

As mentioned above, fuel which is discharged from the fuel pump 2 may contain particulate contaminants such as powder caused by abrasion in the motor of the fuel pump 2. When the pressure regulator 20 is in a closed state, the contaminant powder in fuel which is introduced into the pressure regulator 20 may become caught between the opposing surfaces of the valve 20b and the valve seat 20c, preventing intimate contact between the opposing surfaces and producing a decrease in the sealing ability of the pressure regulator 20. This decrease in sealing ability may allow fuel to leak out of the main housing 5 through the pressure regulator 20.

In the embodiment of FIG. 1, when the engine to which the fuel supply apparatus is connected is turned off for an extended period, if the level of fuel tank 1 is sufficiently low, leakage of fuel from the main housing 5 through the pressure regulator 20 may occur and cause the main housing 5 to run dry. In this state, the engine cannot be restarted until the main housing 5 is refilled with fuel from the fuel pump 2, leading to a delay in restarting. Furthermore, air which is entrained in fuel which is abruptly introduced into the empty main housing 5 when the engine is to be restarted enters into the supply passage 8 from the check valve 9, causing air bubble generation which is an impediment to restarting of the engine.

In the embodiment of FIGS. 5–8, fuel within the main housing 20 can only enter the pressure regulator 20 via the connecting pipe 5d which extends to the upper portion of the main housing 5. Therefore, even if fuel leaks from the pressure regulator 20 when an engine connected to the fuel supply apparatus is stopped, the main housing 5 as a whole will not run dry, since fuel in the portions of the main housing 5 outside of the connecting pipe 5d is prevented by the connecting pipe 5d from flowing into the pressure regulator 20. Therefore, the engine can be restarted without delay and without the introduction of large amounts of air into the engine.

Furthermore, since a decrease in the sealing performance of the pressure regulator 20 is acceptable, the pressure regulator 20 can have a simple valve structure which enables the pressure regulator 20 to be economical and compact.

What is claimed is:

1. A fuel supply apparatus for installation in a fuel tank, comprising a fuel pump, a housing, a filter element disposed in the housing and having an upstream side communicating with a discharge port of the fuel pump, a fuel supply passage communicating with the interior of the housing on a downstream side of the filter element for supplying fuel to an engine, a check valve communicating with the downstream side of the filter element for preventing reverse flow of fuel through the fuel supply passage, and a pressure regulator communicating with the upstream side of the filter element.

2. A fuel supply apparatus for installation in a fuel tank, the fuel supply apparatus comprising:
   a fuel pump having a discharge port;
   a housing;
   a filter element disposed in the housing and having an upstream side communicating with the discharge port of the fuel pump;
   a fuel supply passage communicating with the interior of the housing on a downstream side of the filter element for supplying fuel to an engine;
   a check valve communicating with the downstream side of the filter element for preventing reverse flow of fuel through the fuel supply passage;
   a pressure regulator communicating with the upstream side of the filter element; and
   a sedimentation flow path communicating with an outlet of the pressure regulator,
   wherein the sedimentation flow path removes sediment from fuel discharged from the pressure regulator.

3. A fuel supply apparatus as claimed in claim 2 wherein the sedimentation flow path includes a recess for receiving sediment which settles from fuel passing through the sedimentation flow path.

4. A fuel supply apparatus as claimed in claim 2 including a pump holder which is attached to the housing and supports the fuel pump, and a vibration absorber disposed between the pump holder and the fuel pump, wherein the sedimentation flow path comprises a space formed between an outer periphery of the fuel pump, an inner periphery of the pump holder, and the vibration absorber.

5. A fuel supply apparatus as claimed in claim 2 wherein the housing includes a passage communicating between an upper portion of the housing on the upstream side of the filter element and the pressure regulator.

6. A fuel supply apparatus as claimed in claim 2 including a pump holder surrounding the fuel pump for supporting the fuel pump from the housing, wherein the sedimentation flow path comprises a space formed between an outer periphery of the fuel pump and an inner periphery of the pump holder.

7. A fuel supply apparatus as claimed in claim 6 wherein a portion of the space defined between the inner periphery of the pump holder and the outer periphery of the fuel pump is vertically partitioned to define an annular sedimentation flow path extending along the outer periphery of the fuel pump, the sedimentation flow path including substantially cylindrical vortex spaces defined between a plurality of fins projected from the inner periphery of the pump holder and having blind holes disposed at the bottom of the vortex spaces for trapping the sediments.

* * * * *